(12) United States Patent
Asuke et al.

(10) Patent No.: US 8,926,427 B2
(45) Date of Patent: Jan. 6, 2015

(54) VIDEO GAME WITH SCREEN FLIP AND DUAL SETS OF COLLISION DATA

(75) Inventors: Shigeyuki Asuke, Kyoto (JP); Masataka Takemoto, Kyoto (JP); Kiyoshi Kouda, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 2233 days.

(21) Appl. No.: 11/790,349

(22) Filed: Apr. 25, 2007

(65) Prior Publication Data

US 2008/0039201 A1 Feb. 14, 2008

(30) Foreign Application Priority Data

May 9, 2006 (JP) ................................. 2006-130474

(51) Int. Cl.
*G06T 15/00* (2011.01)
*G06F 15/00* (2006.01)
*A63F 13/40* (2014.01)

(52) U.S. Cl.
CPC .............. *A63F 13/10* (2013.01); *A63F 2300/64* (2013.01); *A63F 2300/643* (2013.01); *A63F 2300/66* (2013.01)
USPC .............. 463/31; 345/427; 345/474; 345/581

(58) Field of Classification Search
USPC .............................. 463/31; 345/427, 474, 581
See application file for complete search history.

(56) References Cited

U.S. PATENT DOCUMENTS

| 5,963,218 | A | * | 10/1999 | Naka et al. ..................... 345/474 |
| 6,102,801 | A | | 8/2000 | Sugawara |
| 6,104,402 | A | * | 8/2000 | Goddard et al. .............. 345/419 |
| 6,128,018 | A | | 10/2000 | Nakajima |
| 6,155,926 | A | * | 12/2000 | Miyamoto et al. ............. 463/32 |
| 2003/0117398 | A1 | * | 6/2003 | Hubrecht et al. ............. 345/423 |

FOREIGN PATENT DOCUMENTS

EP    1 062 993    12/2000
JP    6-337918    12/1994

OTHER PUBLICATIONS

Amato, "Collision Detection", Sep. 15, 1999, 4 pages, www.gamedev.net/reference/articles/article735.asp.
"Chou Makaimura R" (Gameboy Advance cartridge, released on Jul. 19, 2002).
Harbour, "Game Programming, All in One", 2$^{th}$ Edition, Jun. 2004, 23 pages.

* cited by examiner

*Primary Examiner* — Lawrence Galka
(74) *Attorney, Agent, or Firm* — Nixon & Vanderhye P.C.

(57) ABSTRACT

When there is an instruction for rotation during a game in a first field, a CPU core of a game apparatus obtains central coordinates in a second field after the rotation and coordinates (central coordinates) of a player object and BG object in steps S53 and S55. Then, the CPU core executes a rotation process in a hardware calculation circuit, for example, in steps S57 to S61. When detecting end of the rotation in a step S63, the CPU core executes a map switch process in a step S65. In the map switch process, the CPU core generates a second field according to second area data. Then, after generating the second field, the CPU core makes a hit determination according to the second area data in a step S7, for example.

15 Claims, 12 Drawing Sheets

FIG. 4
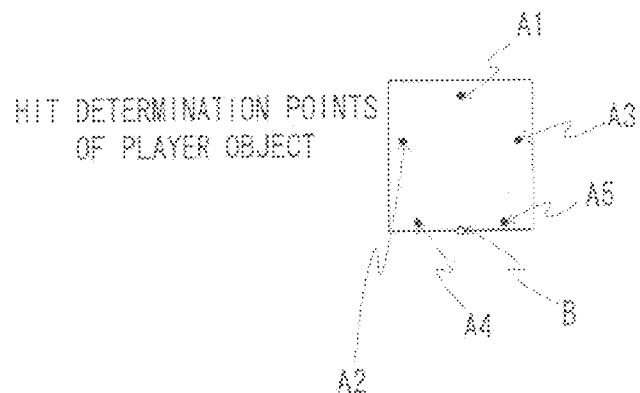
FIG. 5
1: 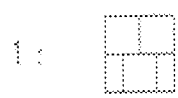
2: 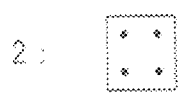
3: 
4: 
5: 
6: 

FIG. 6   FIRST AREA DATA AD1
|   | 1 | 2 | 3 | 4 | 5 | 6 | 7 | 8 | 9 | 10 | 11 |
|---|---|---|---|---|---|---|---|---|---|----|----|
| 1 | 1 | 1 | 1 | 1 | 1 | 1 | 1 | 1 | 1 | 1  | 1  |
| 2 |   |   |   |   | 1 | 1 | 6 |   |   |    |    |
| 3 |   | 1 |   |   |   |   |   |   |   |    |    |
| 4 |   |   |   |   |   |   |   |   |   |    |    |
| 5 |   |   |   |   |   | 1 | 2 | 1 |   |    |    |
| 6 |   |   |   |   |   |   |   |   |   |    |    |
| 7 |   | 3 | 1 | 1 |   |   |   |   |   |    | 5  |
| 8 | 1 | 2 | 1 | 1 | 1 | 1 | 3 | 3 | 1 | 1  | 1  |
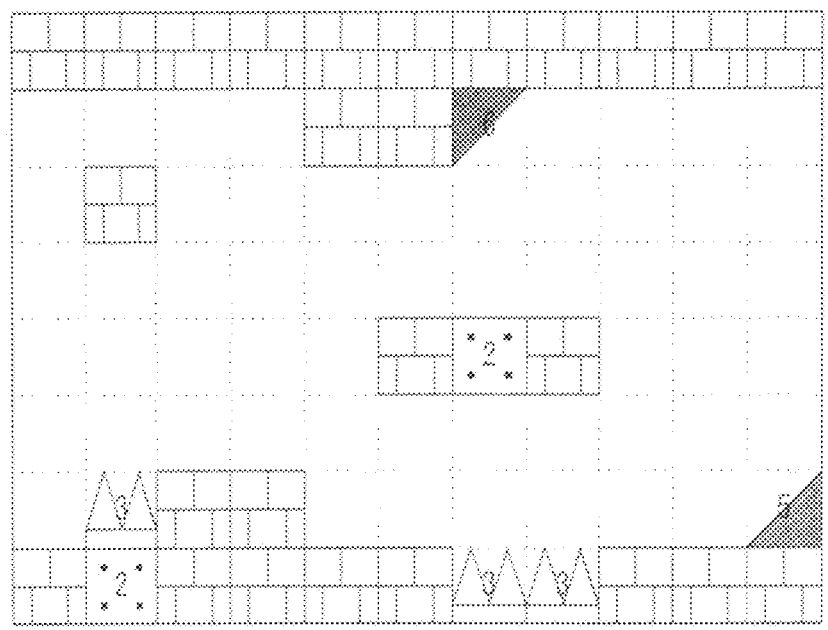
FIG. 7   FIRST FIELD RENDERING IMAGE F1

FIG. 8  SECOND AREA DATA  AD2
|   | 11 | 10 | 9 | 8 | 7 | 6 | 5 | 4 | 3 | 2 | 1 |   |
|---|----|----|---|---|---|---|---|---|---|---|---|---|
| 8 | 1 | 1 | 1 | 4 | 4 | 1 | 1 | 1 | 1 | 2 | 1 | ① |
| 7 | 6 |   |   |   |   |   |   | 1 | 1 | 4 |   | ② |
| 6 |   |   |   |   |   |   |   |   |   |   |   | ③ |
| 5 |   |   |   | 1 | 2 | 1 |   |   |   |   |   | ④ |
| 4 |   |   |   |   |   |   |   |   |   |   |   | ⑤ |
| 3 |   |   |   |   |   |   |   |   |   | 1 |   | ⑥ |
| 2 |   |   |   |   | 5 | 1 | 1 |   |   |   |   | ⑦ |
| 1 | 1 | 1 | 1 | 1 | 1 | 1 | 1 | 1 | 1 | 1 | 1 | ⑧ |
|   | ① | ② | ③ | ④ | ⑤ | ⑥ | ⑦ | ⑧ | ⑨ | ⑩ | ⑪ |   |
FIG. 9  SECOND FIELD RENDERING IMAGE  F2
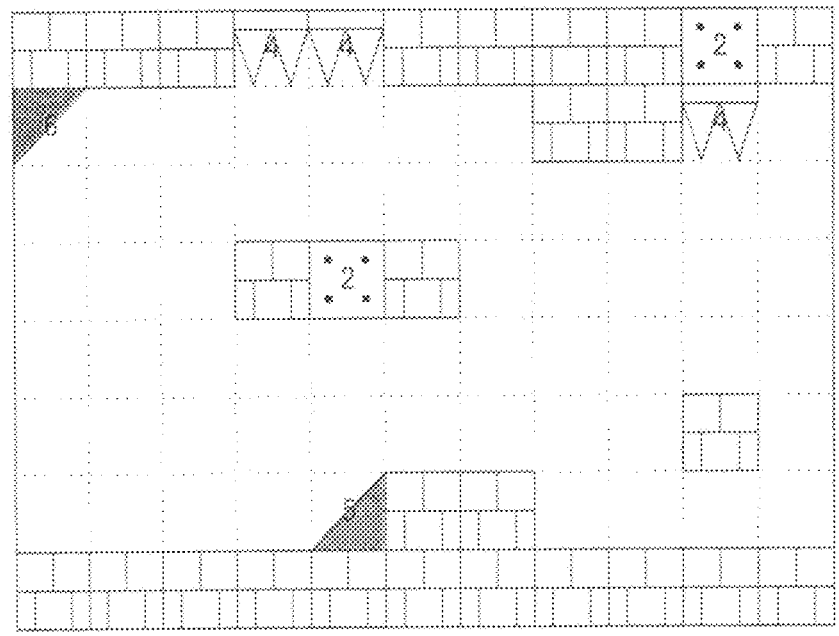

BG OBJECT 4

PLAYER OBJECT

VIDEO GAME WITH SCREEN FLIP AND DUAL SETS OF COLLISION DATA

CROSS REFERENCE TO RELATED APPLICATION

The disclosure of Japanese Patent Application No. 2006-130474 is incorporated herein by reference.

TECHNICAL FIELD

The exemplary embodiments disclosed herein relate to a game program and a game apparatus. More specifically, the exemplary embodiments disclosed herein relate to a game program and a game apparatus that allow rotation of a game screen (field) on a display device.

BACKGROUND AND SUMMARY

Conventionally, there is a game software program in which a game screen (field) on a display device is rotated, "Chou Makaimura R" (Gameboy Advance cartridge, released on Jul. 19, 2002). In this related art, the whole field is rotated when a player object is moved to a predetermined position. This field's rotation makes it possible to proceed to the next field that has been previously unattainable. More specifically, the entry to the next field is provided on the upper side of the current field. When the player object has reached a certain point, the current field rotates through 90 degrees clockwise or counterclockwise and the entry to the next field comes to the right or left side of the current field. After that, the game can be advanced to the next field by leading the player object to the right or left side of the current field.

In the conventional art, however, the whole field is merely rotated and thus there is a problem in that a complicated hit determination cannot be carried out on an object provided within the field. For example, assuming that there is a certain object through which the player object passes when hitting the object from the lower side or on which the player object sits when hitting the object from the upper side. Thus, after the whole field has rotated through 180 degrees, the action of the player object on the object becomes reversed, that is, the player object just bumps against the object without passing through it when hitting it from the lower side, or passes through the object when hitting it from the upper side.

This problem can be avoided by changing a hit determination on each object between before and after the rotation. In this case, however, it is necessary to make a hit determination on each object while discriminating between before and after the rotation, making the determination process complicated.

Therefore, it is a feature of certain exemplary embodiments to provide a novel game apparatus and a novel storage medium storing a game program that make a game screen (field) rotate.

It is another feature of certain exemplary embodiments to provide a game apparatus and a storage medium storing game program that allows a correct hit determination after rotating the field without having to perform an intricate process.

A feature of certain exemplary embodiments includes a storage medium storing a game program executed by a computer of a game apparatus that displays on a display device a state of rotation of a field in which a player character capable of being operated by a player is placed. According to this exemplary embodiment, the game program allows the computer to execute a first display step of placing the player character within a first field formed by a plurality of objects and displaying on the display device a state of the first field containing at least the player object, a rotation display process step of rotating the first field through a predetermined degree of angle when a predetermined requirement is satisfied and of displaying a state of the rotation on the display device, and a second display step of re-placing the player character placed in the first field, in a second field previously formed by a plurality of objects so as to be displayed in a manner identical to the first field rotated through the predetermined degree of angle when the rotation process of the first field has completed in the rotation display process step and of displaying on the display device a state of the second field containing at least the player object.

According to an exemplary embodiment, the game apparatus (10: a reference numeral for a game machine, for example, with exemplification of components corresponding to that in the exemplary embodiments, also applying to the following numerals) makes it possible to rotate a field in which an object (BG object shown in the exemplary embodiments) and a player object exist. The object includes a first object with a first attribute (BG objects 3 and 5 shown in the exemplary embodiment) and a second object with a second attribute identical to the attribute of the post-rotation first object. The game apparatus includes a storage means (42) which stores first area data, second area data, the player object's attribute, and object data containing the first object, the first attribute, the second object, and the second attribute.

In addition, the computer or a CPU core (34) generates and displays a first field (F1) based on the first area data (AD1) in steps S1 and S11 (FIG. 10) forming a first display step, for example.

A predetermined requirement is satisfied when the player object moves to a predetermined position or acts on a certain object, for instance. At that time, the first field is rotated in the rotation process step (S13).

The CPU core (34) generates and displays a second field based on the second area data in steps S83 and S85 forming the second display step, for example.

According to an exemplary embodiment, after the rotation of the game field, the area data is replaced to generate and display the second field or make a hit determination. Thus, it is easy to make a hit determination after the game field is rotated.

Another exemplary embodiment relates to a storage medium storing a game program wherein the computer is allowed to execute a first contact determination step of making a determination on contact between the object forming the first field and the player object when the first field is displayed in the first display step, and execute a second contact determination step of making a determination on contact between the object forming the second field and the player object when the second field is displayed in the second display step.

In this exemplary embodiment, in a step S7 (FIG. 10) forming the first contact determination step, for example, the computer or the CPU core (34) makes a hit determination on the player object with respect to the first object in the first field based on the first area data. Also, in the step S7 (FIG. 10) forming the second contact determination step, for example, the CPU core (34) makes a hit determination on the player object with the second object in the second field based on the second area data. Thus, it is easy to carry out the contact determination.

Another exemplary embodiment relates to a storage medium storing a game program, wherein the object is previously provided with a definition of a process to be performed when making contact with the player object, and the computer is allowed to further execute a first contact process step of performing a contact process based on the definition previously provided to the object when contact between the player object and the object is determined in the first contact determination step and the second contact determination step.

In this exemplary embodiment, when contact between the player object and the object is determined in the first contact determination step and the second contact determination step, the CPU core (34) executes the contact process based on the previously provided definition. Thus, it is easy to carry out the post-contact process.

Another exemplary embodiments relates to a storage medium storing a game program wherein the player object is previously provided with a plurality of contact determination points, and the first contact determination step and the second contact determination step include a contact direction calculation step of calculating in which direction the player object made contact with the object, from a state of contact between the plurality of contact determination points and the object.

In another exemplary embodiment, the player object is provided with five contact determination points, and the CPU core (34) determines the contact direction from the state of contact (hit) between those determination points and the object. Thus, it is easy to make a determination of the contact direction.

Another exemplary embodiment relates to a storage medium storing a game program wherein the object is previously provided with a definition of a process to be performed when making contact with the player object, with respect to each of contact directions, and the game program allows the computer to further execute a second contact process step of performing a contact process based on the definition with respect to the contact direction calculated in the contact direction calculation step previously provided to the object, when contact between the player object and the object is determined in the first contact determination step and the second contact determination step.

In this exemplary embodiment, when determining contact between the player object and the object, the CPU core (34) performs a contact process based on the definition previously provided to the object with respect to the contact direction. Accordingly, since the definitions of contact direction as the first and second attributes are provided, the contact direction process will not become complicated even after the rotation of the game field.

Another exemplary embodiment relates to a storage medium storing a game program wherein the determined requirement is that the player object moves to a predetermined position in the first field.

Another exemplary embodiment relates to a storage medium storing a game program wherein the predetermined requirement is that the player object makes contact with a predetermined object in the first field.

Another exemplary embodiment relates to a storage medium storing a game program wherein the predetermined requirement is that a predetermined period of time passes after the display device displays a state of the first field in the first display step.

According to certain exemplary embodiments, when the player object satisfies a predetermined requirement, the CPU core (34) executes the second display step.

Another exemplary embodiment relates to a storage medium storing a game program wherein the player object is rotated as with the object in the rotation display process step.

Another exemplary embodiment relates to a storage medium storing a game program wherein the player object is not changed in display direction and is rotated as with the player object in the rotation display process step.

Another exemplary embodiment relates to a storage medium storing a game program wherein the player object is not rotated as with the object in the rotation process step.

In the rotation display process step, the CPU core (34) can display the player object in a manner that the player object is rotated as with the object, the player object is not changed in display direction and is rotated as with the object, or the player object is not rotated as with the object.

A certain exemplary embodiment relates to a game apparatus that displays on a display device a state of rotation of a field in which a player character capable of being rotated by a player is placed, comprising a first display means for placing the player character within a first field formed by a plurality of objects and displaying on the display device a state of the first field containing at least the player object, a rotation display process means for rotating the first field through a predetermined degree of angle when a predetermined requirement is satisfied and displaying a state of the rotation on the display device, and a second display means for re-placing the player character placed in the first field, in a second field previously formed by a plurality of objects so as to be displayed in a manner identical to the first field rotated through the predetermined degree of angle when the rotation process of the first field has completed by the rotation display process means and for displaying on the display device a state of the second field containing at least the player object.

Another exemplary embodiment relates to a game apparatus further including a first contact determination means for making a determination on contact between the object forming the first field and the player object when the first field is displayed by the first display means, and a second contact determination means for making a determination on contact between the object forming the second field and the player object when the second field is displayed by the second display means.

Another exemplary embodiment relates to a game apparatus wherein the object is provided with a definition of a process to be performed when making contact with the player object, further including a first contact process means for performing a contact process based on the definition previously provided to the object when contact between the player object and the object is determined by the first contact determination means and the second contact determination means.

Another exemplary embodiment relates to a game apparatus wherein the player object is provided in advance with a plurality of contact determination points, and the first contact determination means and the second contact determination means include a contact direction calculation means for calculating in which direction the player object made contact with the object, from a state of contact between the plurality of contact determination pints and the object.

Another exemplary embodiment relates to a game apparatus wherein the object is previously provided with a definition of a process to be performed when making contact with the player object, with respect to each of contact directions, further including a second contact process means for performing a contact process based on the definition with respect to the contact direction calculated in the contact direction calculation means previously provided to the object, when contact between the player object and the object is determined by the first contact determination means and the second contact determination means.

According to certain exemplary embodiments, the map (area data) is replaced between before and after the rotation of the field, the first field is generated and displayed based on the first area data before the rotation, and the second field is generated and displayed based on the second area data after the rotation. Therefore, it is easy to perform a field generation process before and after the rotation. In addition, by making a hit (contact) determination on the player object against the object based on the first area data for the first field or the second area data for the second field, it is possible to make a hit determination on the player object against the object without having to perform a complicated operation.

The above described features, aspects and advantages of the certain exemplary embodiments described herein will become more apparent from the following detailed description when taken in conjunction with the accompanying drawings.

BRIEF DESCRIPTION OF THE DRAWINGS

FIG. 4 is an illustrative view showing a player object and its attribute (hit determination points) in FIG. 1 exemplary embodiment;

FIG. 5 is an illustrative view showing BG objects of different kinds in FIG. 1 exemplary embodiment;

FIG. 6 is an illustrative view showing one example of first area data for a first field before rotation in FIG. 1 exemplary embodiment;

FIG. 7 is an illustrative view showing one example of a first field rendering image according to the first area data shown in FIG. 6;

FIG. 8 is an illustrative view showing one example of second area data for a second field after rotation in FIG. 1 exemplary embodiment;

FIG. 9 is an illustrative view showing a second field rendering image according to the second area data shown in FIG. 8;

DETAILED DESCRIPTION

Figure 1:
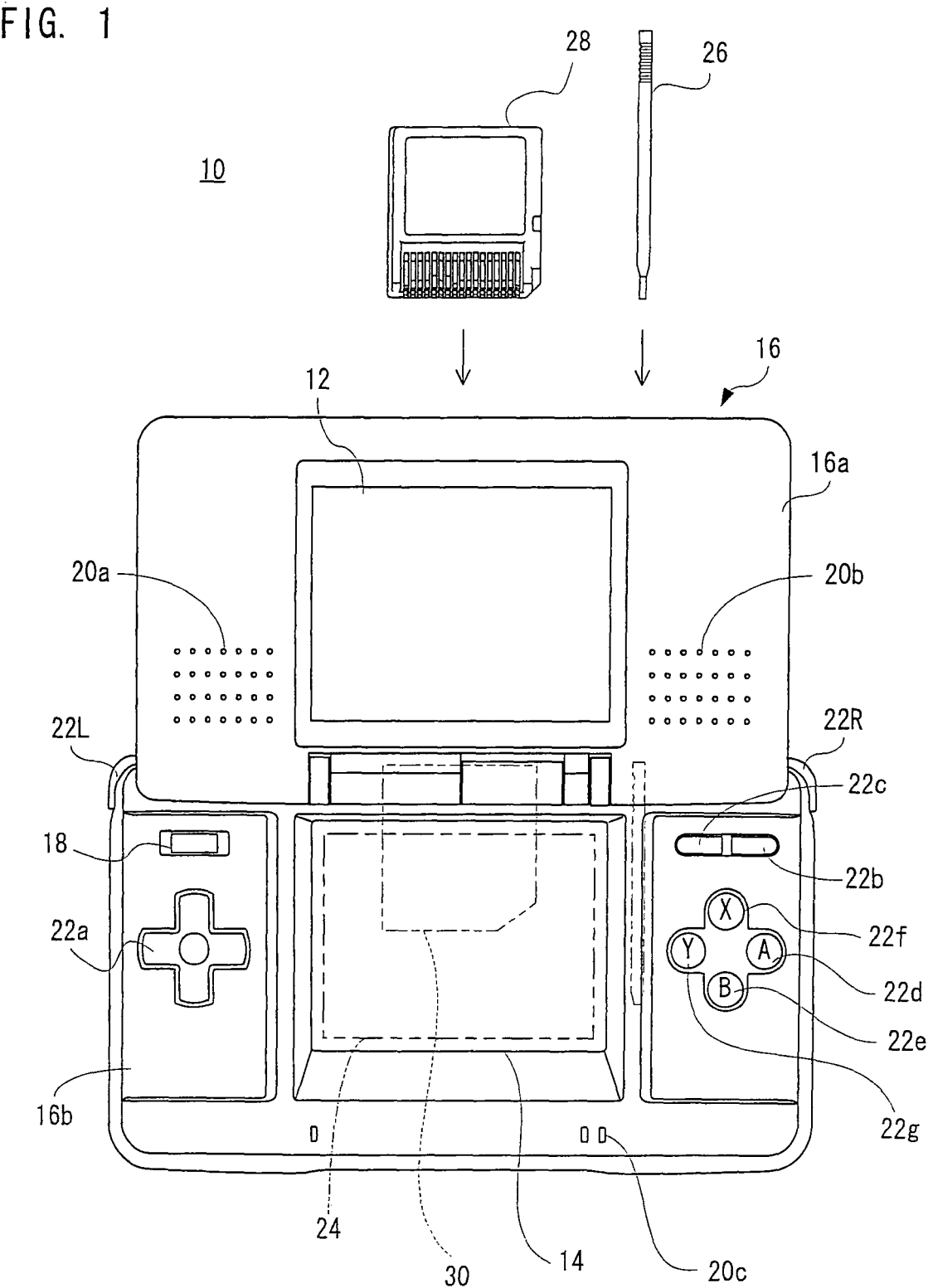
FIG. 1 is an illustrative view showing a game system in one exemplary embodiment.

Referring to FIG. 1, a game apparatus 10 of first exemplary embodiment includes a first liquid crystal display (LCD) 12 and a second LCD 14. The LCD 12 and the LCD 14 are stored in a housing 16 so as to be located in predetermined positions. In this exemplary embodiment, the housing 16 is formed by an upper housing 16a and a lower housing 16b. The LCD 12 is stored in the upper housing 16a and the LCD 14 is stored in the lower housing 16b. Accordingly, the LCD 12 and the LCD 14 are closely arranged in such a manner to line up vertically (above and below).

Some LCDs are used as displays in the first exemplary embodiment, and alternatively, EL (Electronic Luminescence) displays and plasma displays may be employed in place of the LCDs.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. A power switch 18 is provided on a left side of the LCD 14 of the lower housing 16b.

In addition, the upper housing 16a has sound holes 20a and 20b for speakers 36a and 36b (FIG. 2) on the right and left sides of the LCD 12. Further, the lower housing 16b is provided with a microphone hole 20c for a microphone (not shown) and an operating switch 22 (22a, 22b, 22c, 22d, 22e, 22L and 22R).

Additionally, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is placed on the left side of the LCD 14 on the one main surface of the lower housing 16b. Other switches 22b to 22g are placed at the right of the LCD 14 on the one main surface of the lower housing 16b. Furthermore, the switches 22L and 22R are arranged at left and right corners of the upper surface of the lower housing 16b, which are located on both sides of a portion of connection with the upper housing 16a.

The direction instructing switch 22a functions as a digital joystick, and is utilized for instructing a moving direction of a player character (or player object) to be operated by a user or player, instructing a moving direction of a cursor, and so forth by operating any one of four depression portions. Each of the depression portions can be given a particular role (guitar code in this exemplary embodiment). By operating one of the four depression portions, the player can specify (designate) the given role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, i.e., the X button, and the action switch 22g, i.e., the Y button are formed by push buttons, and are used to perform auxiliary operations for the A button 22d and the B button 22e when the game cannot make progress only by these two buttons. However, the X button 22f and the Y button 22g can also be used for the same operations as the A button 22d and the B button 22e perform. As a matter of course, the X button 22f and Y button 22g are not always required to be used in gameplay.

The action switch 22L (left push button) and the action switch 22R (right push button) are formed by the push button. The left push button (L button) 22L and the right push button (R button) 22R can perform the same operation as the A button 22d and the B button 22e, and also function as a subsidiary of the A button 22d and the B button 22e. Further, the L button 22L and the R button 22R can change each of the roles assigned to the direction switch 22a, A button 22d, B button 22e, X button 22f, and Y button 22g, to another one. In this exemplary embodiment, pressing the L button 22L changes the code assigned to the direction switch 22a to another code.

Also, on a top surface of the LCD 14, a touch panel 24 is provided. As the touch panel 24, any one of kinds of a resistance film system, an optical system (infrared rays system) and an electrostatic capacitive coupling system, for example, can be utilized. In response to an operation (touch input) of depressing, stroking or touching with a stick 26, a pen (stylus pen), or a finger (hereinafter, referred to as "stick 26, etc.") on a top surface (detection surface) of the touch panel 24, the touch panel 24 detects coordinates of position of operation (touch position) by means of the stick 26, etc. and outputs coordinate data corresponding to the detected coordinates.

In this exemplary embodiment, a resolution of the display surface of the LCD 14 is 256 dots×192 dots, and a detection accuracy of a detection surface of the touch panel 24 is also rendered 256 dots×192 dots in correspondence to the resolution of the display surface (this is the same or approximately the same as for the LCD 12). However, detection accuracy of the detection surface of the touch panel 24 may be lower than the resolution of the display surface of the LCD 14, or higher than it.

The LCD 12 and the LCD 14 can display different game screens. In a race game, for example, one LCD may display a screen indicating a view from a driving seat, and the other LCD may display a screen for the entire race (course). Also, in an RPG, one LCD may display a map and characters such as player character, and the other LCD may display items owned by the player character. Further, one LCD (the LCD 12 in this exemplary embodiment) may display a game screen for playing a game, and the other LCD (the LCD 14 in this exemplary embodiment) may display a game screen (operating screen) containing operational objects such as lines and graphics (including icons) for operating the game. Furthermore, using the two LCDs 12 and 14 together as one screen, it is possible to display an enormous creature (enemy character) to be defeated by the player character.

Thus, through operation of the touch panel 24 with the stick, etc. 26, the player can point to (designate) an image of any of player characters, enemy characters, item characters, and operational objects, which are displayed on the screen of the LCD 14, or can select (input) a command. In addition, the player can change a direction of a virtual camera (viewpoint) provided in a three-dimensional game space or can specify a direction of scrolling (gradually moving) game screen (map).

Besides, according to the kind of the game, the touch panel 24 can be used for other input instructions. For example, it is possible to input a coordinate input instruction or input handwritten characters, numbers, symbols, etc. to the LCD 14.

As stated above, the game apparatus 10 has the LCD 12 and the LCD 14 as a display portion of two screens, and by providing the touch panel 24 on an upper surface of any one of them (LCD 14 in the first exemplary embodiment), the game apparatus 10 has the two screens (LCD 12, 14) and the two operating portions (22, 24).

Additionally, in this exemplary embodiment, the stick 26 can be stored in a housing portion (indicated by dotted lines in FIG. 1) provided in the lower housing 16b, for example, and taken out therefrom as necessary. However, in a case of not preparing the stick 26, it is not necessary to provide the housing portion.

Also, the game apparatus 10 includes a memory card (or cartridge) 28, and the memory card 28 is detachable, and inserted into a loading slot 30 (indicated by dotted lines in FIG. 1) provided on a rear surface or a lower edge (bottom surface) of the lower housing 16b. Although omitted in FIG. 1, a connector 32 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Although not illustrated in FIG. 1, speakers 36a and 36b (see FIG. 2) are provided in a position corresponding to the sound holes 20a and 20b inside the upper housing 16a.

Furthermore, although omitted in FIG. 1, for example, a battery accommodating box is provided on a rear surface of the lower housing 16b, and a volume switch, an external expansion connector, an earphone jack, etc. are provided on a bottom surface of the lower housing 16b.

Figure 2:
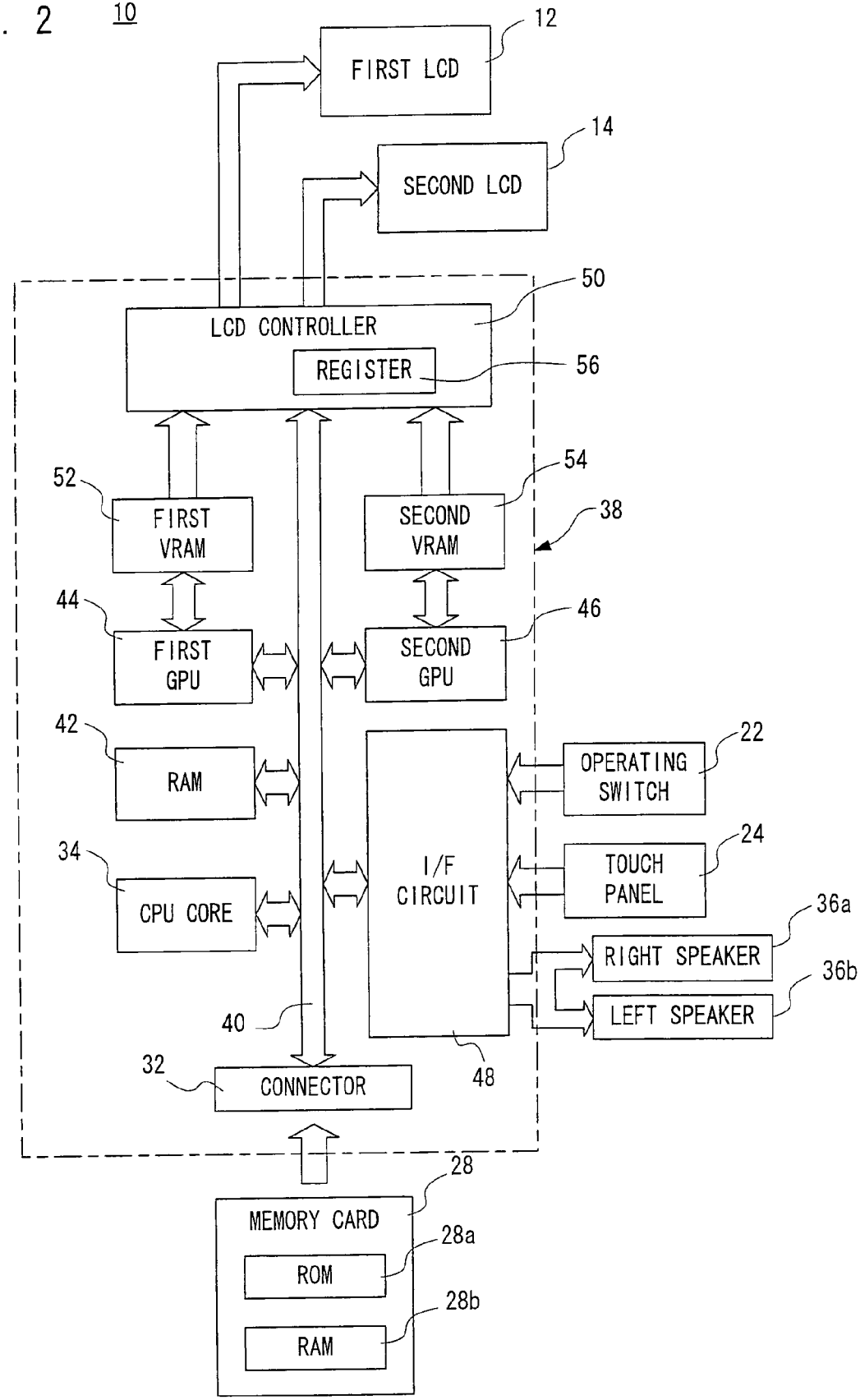
FIG. 2 is a block diagram showing in detail a game apparatus in FIG. 1 exemplary embodiment.

FIG. 2 is a block diagram showing an electric configuration of the game apparatus 10. Referring to FIG. 2, the game apparatus 10 includes an electronic circuit board 38, and on the electronic circuit board 38, circuit components such as a CPU core 34, etc. are mounted. The CPU core 34 is connected to the connector 32 via a bus 40, and is connected with a RAM 42, a first graphics processing unit (GPU) 44, a second GPU 46, an input-output interface circuit (hereinafter, referred to as "I/F circuit") 48, and an LCD controller 50.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game (virtual game) to be executed by the game apparatus 10, image data (letter and character images, background images, item images, icon (button) images, message images, etc.), data of sound (music) required for the game (sound data), etc. The RAM (backup RAM) 28b stores (saves) proceeding data and result data of the game.

The RAM 42 is utilized as a buffer memory or a working memory. That is, the CPU core 34 loads the game program, the image data, the sound data, etc. stored in the ROM 28a of the memory card 28 into the RAM 42, and executes the loaded game program. The CPU core 34 executes a game process while storing in the RAM 42 data (game data and flag data) temporarily generated in correspondence with a progress of the game.

Besides, such the game program, the image data, the sound data, etc. are loaded from the ROM 28a entirely at a time, or partially and sequentially so as to be stored (loaded) into the RAM 42.

However, the ROM 28a of the memory card 28 also stores a program for an application other than the game and stores image data required for execution of the application. Also, the ROM 28a may store sound (music) data as necessary. In this case, the game apparatus 10 executes the application.

Each of the GPU 44 and the GPU 46 forms a part of a rendering means, is constructed by, for example, a single chip ASIC, and receives a graphics command (graphics command) from the CPU core 34 to generate game image data according to the graphics command. However, the CPU core 34 provides each of the GPU 44 and the GPU 46 with an image generating program (included in the game program) required for generation of the game image data in addition to the graphics command.

Furthermore, the GPU 44 is connected with a first video RAM (hereinafter, referred to as "VRAM") 52, and the GPU 46 is connected with a second VRAM 54. The GPU 44 and the GPU 46 obtain data required for the GPU 44 and the GPU 46 to execute the graphics command (image data: character data, texture data, etc.) by access to a first VRAM 52 and a second VRAM 54, respectively.

Also, the CPU core 34 writes the image data required for graphics drawing into the first VRAM 52 and the second VRAM 54 via the GPU 44 and the GPU 46. The GPU 44 accesses the VRAM 52 to generate the game image data for graphics drawing, and the GPU 46 accesses the VRAM 54 to generate the game image data for graphics drawing.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. In a case that the data value of the register 56 is "0", the LCD controller 50 outputs the game image data generated by the GPU 44 to the LCD 12, and outputs the game image data generated by the GPU 46 to the LCD 14. Furthermore, in a case that the data value of the register 56 is "1", the LCD controller 50 outputs the game image data generated by the GPU 44 to the LCD 14, and outputs the game image data generated by the GPU 46 to the LCD 12.

Besides, the LCD controller 50 reads out game image data directly from the VRAM 52 and the VRAM 54, and reads out game image data from the VRAM 52 and the VRAM 54 via the GPU 44 and the GPU 46.

The I/F circuit 48 is connected with the operating switch 22, the touch panel 24, the speakers 36a and 36b. Here, the operating switch 22 is the above-described switches 22a, 22b, 22c, 22d, 22e, 22g, 22L and 22R, and in response to an operation of the operating switch 22, a corresponding operation signal is input to the CPU core 34 via the I/F circuit 48. Furthermore, the coordinate position data from the touch panel 24 is input to the CPU core 34 via the I/F circuit 48. In addition, the CPU core 34 reads the sound data necessary for the game such as game music (BGM), sound effects and voices (onomatopoeic sounds) of game characters (game objects), etc. from the RAM 42, and outputs it from the speakers 36a, 36b via the I/F circuit 48.

Figure 3:
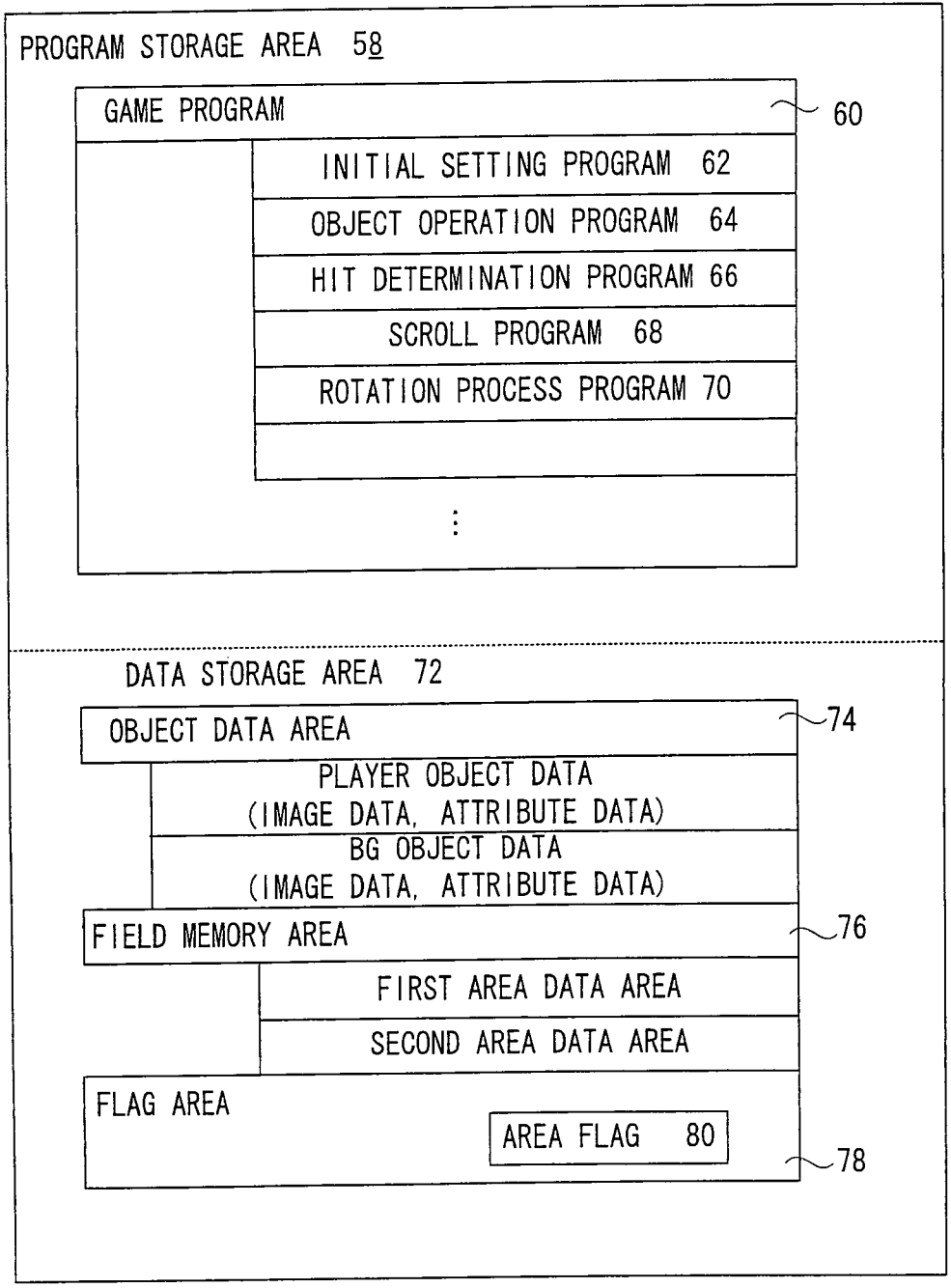
FIG. 3 is an illustrative view showing one example of memory map of a RAM in FIG. 2.

Referring to FIG. 3, the RAM 42 has a program storage area 58 in which a game program 60 is stored. The game program 60 is entirely read at one time or is partially read as necessary from the above mentioned ROM 28a, and stored in the program storage area 58.

The game program 60 typically includes an initial setting program 62, an object operation program 64, a hit determination program 66, a scroll program 68, a rotation process program 70, etc.

Figure 11:
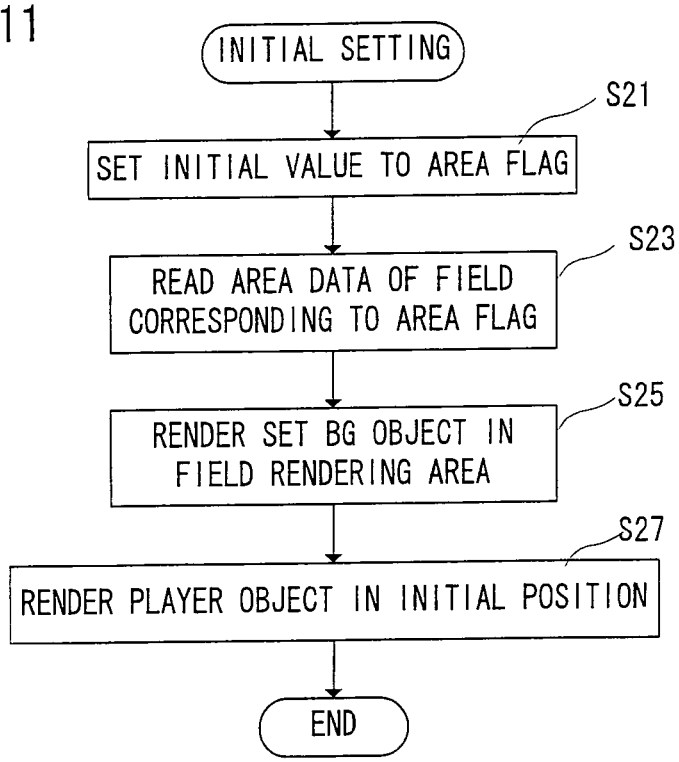
FIG. 11 is a flowchart showing the details of an initial setting process shown in FIG. 10.

The initial setting program 62, specifically shown in FIG. 11 described later, is a program for rendering a player object and BG objects in a field with a designated field number (set in an area flag 80 described later).

The object operation program 64 controls the player object's movements and actions (jumping, walking, fighting, etc.) according to an operation signal input by a player through manipulation of the operating means 26 of the controller 22.

Figure 12:
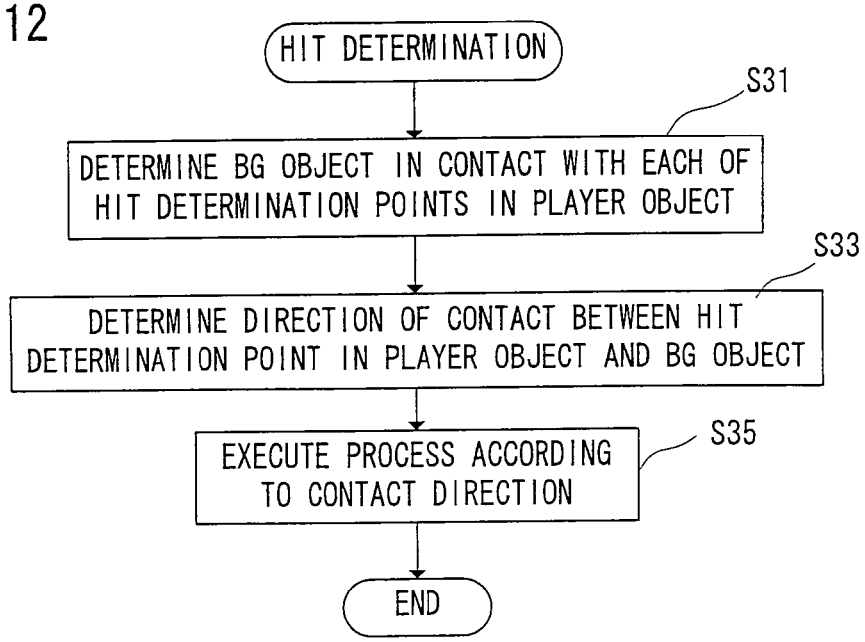
FIG. 12 is an illustrative view showing the details of a hit determination process shown in FIG. 10.

The hit determination program 66, specifically shown in FIG. 12 described later, makes a determination on the presence or absence of a hit (contact, collision) of the player object against a BG object. When the two objects are in the hit state, the program finds a direction of the player object's contact with the BG object (in which direction the player object has contacted the BG object), and also subjects the player object and/or the BG object to a preset process according to the contact direction.

Figure 15:
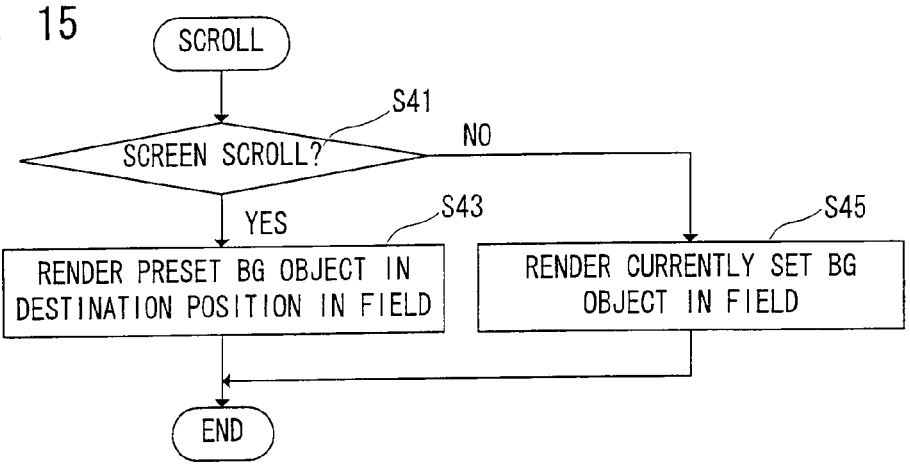
FIG. 15 is a flowchart showing the details of a scroll process shown in FIG. 10.

The scroll program 68, specifically shown in FIG. 15 described later, is a program for scrolling the game screen or the field under an instruction for scrolling.

The rotation process program 70, specifically shown in FIG. 16 described later, is a program for rotating the game screen, i.e., the field, in response to an instruction for rotation.

The RAM 42 further has a data storage area 72 in which an object data storage area 74 is provided. The object data storage area 74 stores player object data and BG object data.

As aforesaid, the player object is an object whose movements and actions can be controlled by the game player through the manipulation of the controller 22. The player object data includes image data on such a player object and attribute data previously provided to the player object, such as a plurality of predetermined hit determination points (five in this exemplary embodiment) A1 to A5 and a reference point B as shown in FIG. 4.

The BG object is an object incapable of being operated or controlled by the game player, and forms a background (BG) image as a still picture, for instance. One example of such a BG object is given in FIG. 5. However, needless to say, the BG object shown in FIG. 5 is a mere exemplification. The BG object may be also called BG data in some instances.

A BG object 1 shown in FIG. 5 is a wall block. The wall block causes no damage to the player object and limits the player object's movable range because the player object cannot go ahead any further when hitting the wall block. When the player object makes contact with the wall block from the lower side, the wall block is vibrated and, if any item or the like is hidden behind the wall block, the item makes its appearance. A BG object 2 shown in FIG. 5 is a fixed block. The fixed block is the same as the wall block in that it causes no damage to the player object and limits the player object's movable range because the player object cannot go forward any further when hitting against the fixed block. However, the player object cannot make the fixed block vibrate from the lower side and there is no item or the like hidden behind the fixed block.

Meanwhile, as for BG objects 3 (4) and 5 (6) shown in FIG. 5, the BG object 3 turns into the BG object 4 by its rotation and vice versa, and the BG object 5 turns into the BG object 6 by its rotation and vice versa. In this exemplary embodiment, the BG object 3 is called "prickles" and the BG object 4 is called "icicles". Also, in this exemplary embodiment, the BG object 5 is called "hill" and the BG object 6 is called "ceiling".

For example, the attributes of the BG objects 3 (4) and 5 (6) are specifically decided as listed in Tables 1 to 4 below.

For a description of the attributes with application of table 1 to this exemplary embodiment, the BG object 3 "prickles" causes some damage to the player object when contacted by the player object from the upper side because this object has "prickles" on upper side thereof. However, the BG object 3 causes no damage to the player object when contacted by the player object from any of the other sides, lower, left and right, and the player object just gets stuck on that side. Also, the BG object 1 cannot move by itself and is represented as a stationary object.

As can be well understood from FIG. 5, the BG object 4 is expressed by an image of the BG object 3 "prickles" that is rotated through 180 degrees. Accordingly, the image of a post-rotation BG object can be provided by rotating individual dots of a bitmap image (developed in the VRAM) by calculation, for example. Therefore, conventionally, a BG object whose image can be obtained by rotating another BG object has not been separately prepared as a post-rotation BG object. On this account, whenever the player object makes contact with a BG object, the computer or the CPU is required to determine whether the BG object is rotated or not, and if the BG object is being rotated, the computer or the CPU needs to determine by calculation from which side the player object will be damaged through contact with the BG object, for conversion of the hit attribute. This results in a heavy load on the computer or the CPU.

On the contrary, in this exemplary embodiment, the object data is also prepared for the BG object 4 whose image is identical to that of the post-rotation BG object 3, and the hit attribute of the BG object 4 is preset to the object data in correspondence with the hit attribute of the pre-rotation BG object 3. For example, the BG object 3 has "prickles" on upper side thereof, and thus the player object suffers damage when contacting the upper side of the BG object 3. On the other hand, the BG object 4 has "prickles" on a lower side thereof, and thus its attribute is configured so as to cause damage to the player object when contacted from the lower side.

In this exemplary embodiment, however, the BG object 3 is "prickles" displayed as a stationary object. The BG object 4 is "icicles" that may go downward, but this is an attribute associated with an action, not a hit attribute. Thus, it is not necessarily required to set the action attribute of the rotated BG object 4 so as to be identical or correspond to the action attribute of the pre-rotation BG object 3.

As described above, the hit attribute of the post-rotation BG object 4 is preset in correspondence with the hit attribute of the pre-rotation BG object 3. Thus, after the rotation of the game field, it is possible to make a hit determination on the player object by using the hit attribute of the BG object 4 as it is, thus making easier a rotation process that has contributed to an increased load on the CPU in the conventional art.

The same thing can be said to a relation between the BG object 5 "hill" shown in Table 3 and the BG object 6 "ceiling" shown in Table 4. The BG object 5 has a pre-rotation image and a hit attribute, and the BG object 6 has a post-rotation image and a hit attribute. To put it simply, since the BG object 5 is "hill", when the player object contacts the object from the left side, the player object is subjected to a hit process in which it climbs a slope, and when the player object contacts the object from the upper side, the player object is subjected to a hit process in which it gets stuck on the side (this is a determination in the case of a 45-degree slope). Meanwhile, since the BG object 6 is "ceiling", when the player object contacts the object from either the right side or the lower side, the player object is also subjected to a hit process in which it gets stuck on the side (this is a determination in the case of a 45-degree slope).

TABLE 1

| 3: Prickles (before rotation) | Contacted from upper side | Cause damage |
|---|---|---|
| | Contacted from lower side | Make get stuck on the side |
| | Contacted from left side | Make get stuck on the side |
| | Contacted from right side | Make get stuck on the side |
| | Action | Stationary |

TABLE 2

| 4: Prickles (after rotation) [Icicles] | Contacted from upper side | Make get stuck on the side |
|---|---|---|
| | Contacted from lower side | Cause damage |
| | Contacted from left side | Make get stuck on the side |
| | Contacted from right side | Make get stuck on the side |
| | Action | May go downward |

TABLE 3

| 5: Hill (before rotation) | Contacted from upper side | Make get stuck on the side (determination on 45-degree slope) |
|---|---|---|
| | Contacted from lower side | Make get stuck on the side |
| | Contacted from left side | Make climb a slope (determination on 45-degree slope) |
| | Contacted from right side | Make get stuck on the side |
| | Action | Stationary |

TABLE 4

| 5: Hill (after rotation) [ceiling] | Contacted from upper side | Make get stuck on the side |
|---|---|---|
| | Contacted from lower side | Make get stuck on the side (determination on 45-degree slope) |
| | Contacted from left side | Make climb a slope |
| | Contacted from right side | Make get stuck on the side (determination on 45-degree slope) |
| | Action | Stationary |

Returning to FIG. 3, the data storage area 72 further has a field memory area 76. The field memory area 76 is also called screen memory area, and is an area for storing or setting area data indicating a layout of the BG objects within the game field, having first area data for a pre-rotation layout and second area data for a post-rotation layout.

FIG. 6 illustrates one example of first area data AD1. In FIG. 6, it is assumed that BG objects can be arranged and displayed with an 8 (vertical)×11 (horizontal) matrix on the whole game screen (field), for example. With the upper left corner as an origin point in FIG. 6, the BG object 1, i.e., the wall block is arranged in all the columns along the first line (horizontal). The same wall block is arranged in the fifth and sixth columns along the second line, in the second column along the third line, in the sixth and eighth columns along the fifth line, in the third and fourth columns along the seventh line, and in all the columns except for the second, seventh and eighth ones along the eighth line. Besides, the BG object 6

"ceiling" is placed in the seventh column along the second line, the BG object 2, i.e., the fixed block is arranged in the seventh column along the fifth line and the second column along the eighth line. In addition, the BG object 3, i.e., "prickles" is placed in the second column along the seventh line, the seventh and eighth columns along the eighth line. The BG object 5 "hill" is positioned in the eleventh column along the seventh line. As stated above, the data indicative of in which positions which BG objects will be displayed is referred to as area data (AD), and stored in the field memory area 76.

Since the area data shown in FIG. 6 represents a pre-rotation field and constitutes the first area data, the game screen according to the first area data AD1, that is, a first field rendering image F1 can be as shown in FIG. 7, for example. In the game image F1 shown in FIG. 7, the BG object 1 (wall block) is rendered and displayed in places given the number "1" as first area data as shown in FIG. 6, the BG object 2 (fixed block) in places given the number "2" as first area data, the BG object 3 (prickles) in places given the number "3" as first area data, the BG object 5 (hill) in places given the number "5" as first area data, and the BG object 6 (ceiling) in places given the number "6" as first area data, respectively.

One example of the second area data AD2 is illustrated in FIG. 8. In FIG. 8 as well, the BG objects can be arranged and displayed with an 8 (vertical)×11 (horizontal) matrix in the same manner. The origin point shown in FIG. 6 corresponds to a point at the lower right corner in FIG. 8. Specifically, the second field obtained by rotating the first field refers to a field obtained by rotating the first field through 180 degrees.

Thus, for the second area data AD2, circled line and column numbers obtained by reversing the line and column numbers shown in FIG. 6, are provided in their individual display places in FIG. 8 for reference. More specifically, with an origin point at the lower right corner in the field memory shown in FIG. 8, the line numbers are provided upward in ascending order and the column numbers are provided leftward in ascending order. For example, the first line in FIG. 6 is represented as the eighth line in FIG. 8, and the eleventh column in FIG. 6 is shown as the first column in FIG. 8.

Since the second field in FIG. 8 is obtained by rotating the first field in FIG. 6, the second area data AD2 is provided in FIG. 8 so that the same BG objects as those in FIG. 6 are arranged in the places indicated by the same line and column numbers as those in FIG. 6.

The BG object 1 (wall block) is provided in all the columns along the first line in FIG. 8. The same wall block is also arranged in FIG. 8 in the fifth and sixth columns along the second line, in the second column along the third line, in the sixth and eighth columns along the fifth line, in the third and fourth columns along the seventh line, and in all the columns except for the second, seventh and eighth ones along the eighth line. In addition, the BG object 5 "hill" is provided in the seventh column along the second line. Although the BG object 6 "ceiling" is placed in this position in the first area data in FIG. 6, the FIG. 8 field is obtained by rotating the FIG. 6 field, and thus the BG object 6 as a rotatable BG object is replaced by the BG object 5 (hill) as a post-rotation BG object.

Besides, the BG object 2 as fixed block is placed in the seventh column along the fifth line and the second column along the eighth line in FIG. 8.

Further, the BG object 4, i.e., "icicles" is arranged in the second column along the seventh line and in the seventh and eighth columns along the eighth line. Although the BG object 3 "prickles" is positioned in these places in the first area data of FIG. 6, the field in the second area data of FIG. 8 has a matrix obtained by rotating FIG. 6, and thus the BG object 3 as a rotatable BG object is replaced by the BG object 4 as a post-rotation BG object.

The BG object 6 "ceiling" is provided in the eleventh column along the seventh line of FIG. 8. Although the BG object 5 "hill" is positioned in this place in the first area data of FIG. 6, FIG. 8 represents the field obtained by rotating FIG. 6, and thus the BG object 5 as a rotatable BG object is replaced by the BG object 6 as a post-rotation BG object.

The area data shown in FIG. 8 is the second area data because it represents a post-rotation field, and a game screen according to the second area data AD2, that is, the second field rendering image F2 is as shown in FIG. 9, for example. In the game image F2 of FIG. 9, the BG object 1 (wall block) is displayed in places given the number "1" as the second area data, the BG object 2 (fixed block) is displayed in places given the number "2" as the second area data, the BG object 4 (icicles) is displayed in places given the number "4" as the second area, the BG object 5 (hill) is displayed in places given the number "5" as the second area data, and the BG object 6 (ceiling) is displayed in places given the number "6" as the second area data, respectively. The second area data AD2 of FIG. 8 is used for making a hit determination as well as generating the post-rotation second field.

Besides, the game image F2 of FIG. 9 obtained by rotating the game image F1 of FIG. 7 can be displayed by performing rotation calculation with the use of a dedicated hardware unit to determine the positions of dots or pixels after the rotation and providing the corresponding dots of FIG. 7 in the post-rotation dot positions. Such rotation rendering may be implemented by any method.

Returning to FIG. 3 again, the data storage area 72 has a flag area 78 in which an area flag 80 is set. The area flag 80 is a register for setting the area number for an area under a rendering process.

Figure 10:
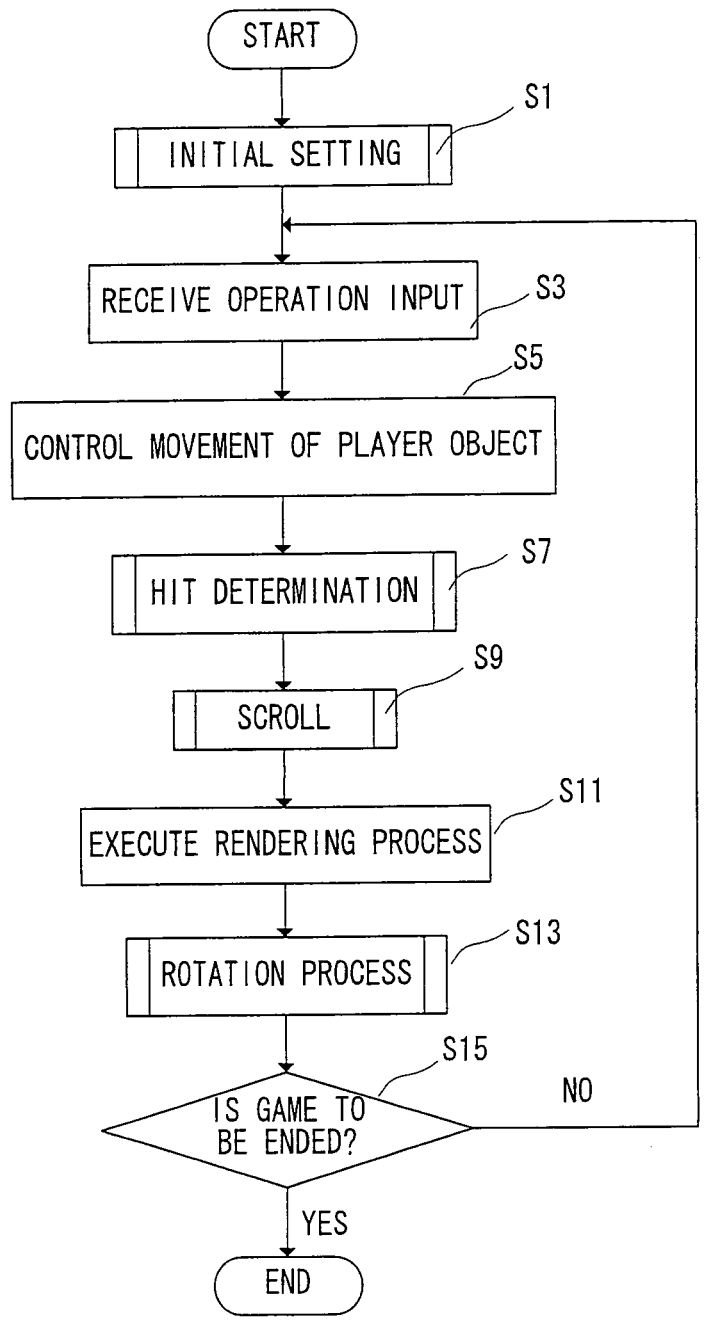
FIG. 10 is a main flowchart showing operation of FIG. 1 exemplary embodiment.

FIG. 10 is a main flowchart indicating the operation of this exemplary embodiment. It should be noted that the main flowchart will be repeatedly executed at intervals of one frame or a few frames of the game machine 12.

In a first step S1 of FIG. 10, the CPU core 34 executes an initial setting process. The details of the initial setting process are given in FIG. 11. In a step S21 of FIG. 11, the CPU core 34 sets an initial value, i.e., the area number for an area to be rendered, to the area flag 80 (FIG. 3). In a succeeding step S23, the CPU core 34 reads area data on the field associated with the area number set to the area flag 80 (e.g. the AD1 shown in FIG. 6) into the field memory area 76 shown in FIG. 3. Then, in a step S25, the CPU core 34 sends an instruction for rendering to the GPU 44 so that the BG objects can be rendered in the rendering area of the field according to the area data. As a result, the game image F1 shown in FIG. 7 is displayed, for example. In a succeeding step S27, the CPU core 34 transmits an instruction for rendering to the GPU 44 in the same manner so that the player object can be rendered in a player object initial position in the same game field in which the BG objects were drawn in the above mentioned step S25. Thus, the initial setting process generates the first game field F1, and then the CPU core 34 returns to a next step S3 of FIG. 10.

In the step S3 of FIG. 10, the CPU core 34 fetches an operation signal from the operating switch 22 input through the I/F circuit 48. In a step S5, the CPU core 34 moves or controls the player object displayed in the first game field F1 according to the operation signal.

After that, the CPU core 34 executes a hit determination process in a step S7 of FIG. 10. The hit determination process step is described in detail in FIG. 12. In a first step S31 of FIG.

Figure 13:
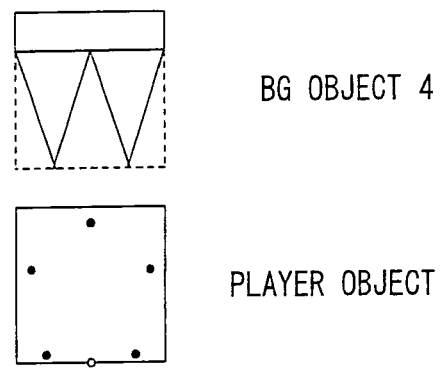
FIG. 13 is an illustrative view showing one example of the hit determination shown in FIG. 12.

12, the CPU core 34 determines BG objects that have made contact with the hit determination points. As previously described with reference to FIG. 4, the player object is provided with five hit determination points A1 to A5, for example, and in the step S31, the CPU core 34 detects the BG object in contact with any of these hit determination points A1 to A5. This contact determination or hit determination is carried out by watching for any overlap between the hit determination points and the BG objects as shown in FIG. 13, for example. The overlap between the hit determination point and the BG object is determined by the block-shaped rendering area of the BG object, not by the BG object's shape itself, as indicated by dotted lines in FIG. 13. This is because the BG objects have various kinds of shapes and thus setting a portion for overlap determination on each of those shapes would make the program complicated, resulting in an excessive load on the CPU core 34.

Figure 14:
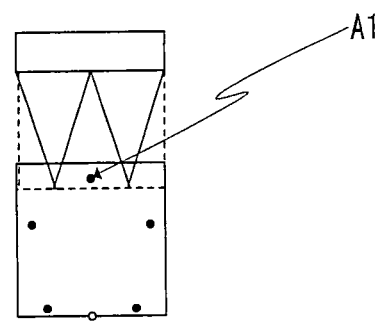
FIG. 14 is an illustrative view showing one example of a contact direction determination shown in FIG. 12.

In a succeeding step S33, the CPU core 34 determines a direction of contact between the hit determination points A1 to A5 of the player object and the BG object. The direction of contact can be determined by detecting which of the hit determination points of the player object has overlapped the BG object. FIG. 14 shows an example in that the hit determination point A1 of the player object has overlapped the BG object. In this example, the CPU core 34 will determine that the player object has contacted the BG object 4 from the lower side. This is because, as apparent from FIG. 4, the determination point A1 corresponds to the head of the player object and the head can make contact with only the lower side of the BG object. With this example included, Table 5 shows specific patterns for determination on contact direction.

TABLE 5

| Contact manner | Determination |
|---|---|
| Only hit determination point A1 in contact with BG object | Contact from lower side |
| Only hit determination point A2 in contact with BG object | Contact from right side |
| Only hit determination point A3 in contact with BG object | Contact from left side |
| Either hit determination point A4 or A5 or both in contact with BG object | Contact from upper side |
| Both hit determination points A1 and A2 in contact with BG object | Contact from lower right side |
| Both hit determination points A1 and A3 in contact with BG object | Contact from lower left side |
| Both hit determination points A2 and A4 in contact with BG object | Contact from upper right side |
| Both hit determination points A3 and A5 in contact with BG object | Contact from upper left side |

Then, in a next step S35, the CPU core 34 executes a process according to the contact direction determined in the step S33. As previously described using Tables 1 to 4 as examples, the object data area 74 of FIG. 3 defines how control should be exercised on the player object, depending on the contact direction of the player object with each BG object. Thus, the CPU core 34 controls the player object according to the definition. In the example of FIG. 14, for instance, the player object has contacted the BG object 4 from the lower side, and thus the CPU core 34 will exercise a process of causing damage to the player object, making reference to Table 2.

As above, upon completion of hit determination between the player object and the BG object in the step S7, the CPU core 34 executes a scroll process in a next step S9. The scroll process is described in detail in FIG. 15. More specifically, in the scroll process, the CPU core 34 firstly determines in a step S41 whether there is an instruction for scrolling or not. If "YES", the CPU core 43 renders a preset BG object at a destination place in the field. If "NO", the CPU core 43 renders the currently set BG object again. In a next step S11 of FIG. 10, the CPU core 34 renders the player object based on the results of movement control in the step S5 and hit determination in the step S7. Accordingly, such an image of the player object suffering damage from contact with the BG object is displayed in the step S11.

In a next step S13 of FIG. 10, the CPU core 34 executes a rotation process. Then, the CPU core 34 determines in a step S15 whether the game has come to an end or not, and terminates the process if "YES" or return to the earlier step S3 to continue the process if "NO".

Figure 16:
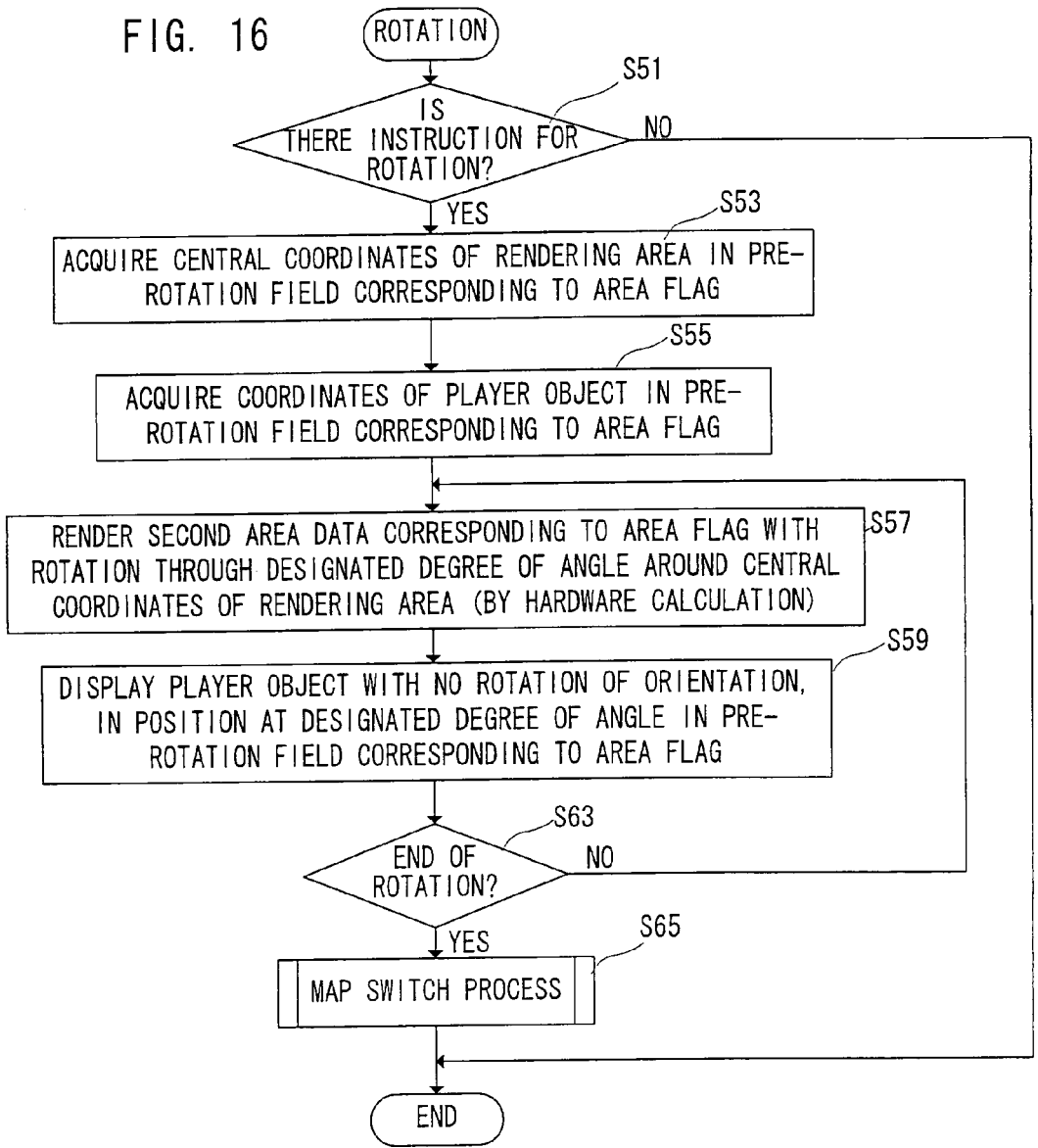
FIG. 16 is a flowchart showing the details of a rotation process shown in FIG. 10.

The rotation process of step S13 is described in detail in FIG. 16. In a first step S51 of FIG. 16, the CPU core 34 determines whether there is an instruction for rotation or not. In this exemplary embodiment, the game field can be rotated by making the player object contact a predetermined item, for example. When the player object contacts a wall block from the lower side, the wall block vibrates and an item behind the wall block make its appearance. With the player object's contact with the item, an instruction for rotation is provided to the CPU core 34 according to the contact, and thus the determination in the step S51 becomes "YES".

However, the instruction for rotation can be also input by the player through manipulation of the operating switch 22, instead of using the above mentioned method. In addition, the instruction for rotation can also be input by moving the player object to a predetermined position. Further, the instruction for rotation can also be given by making the player object contact with not only an item but also a predetermined object. Moreover, the instruction for rotation may be possibly provided under the condition that the player object continuously exists in the first game field for a predetermined period of time or more. Which one of the above methods to use for providing an instruction for rotation depends on the requirements of the game.

Figure 18:
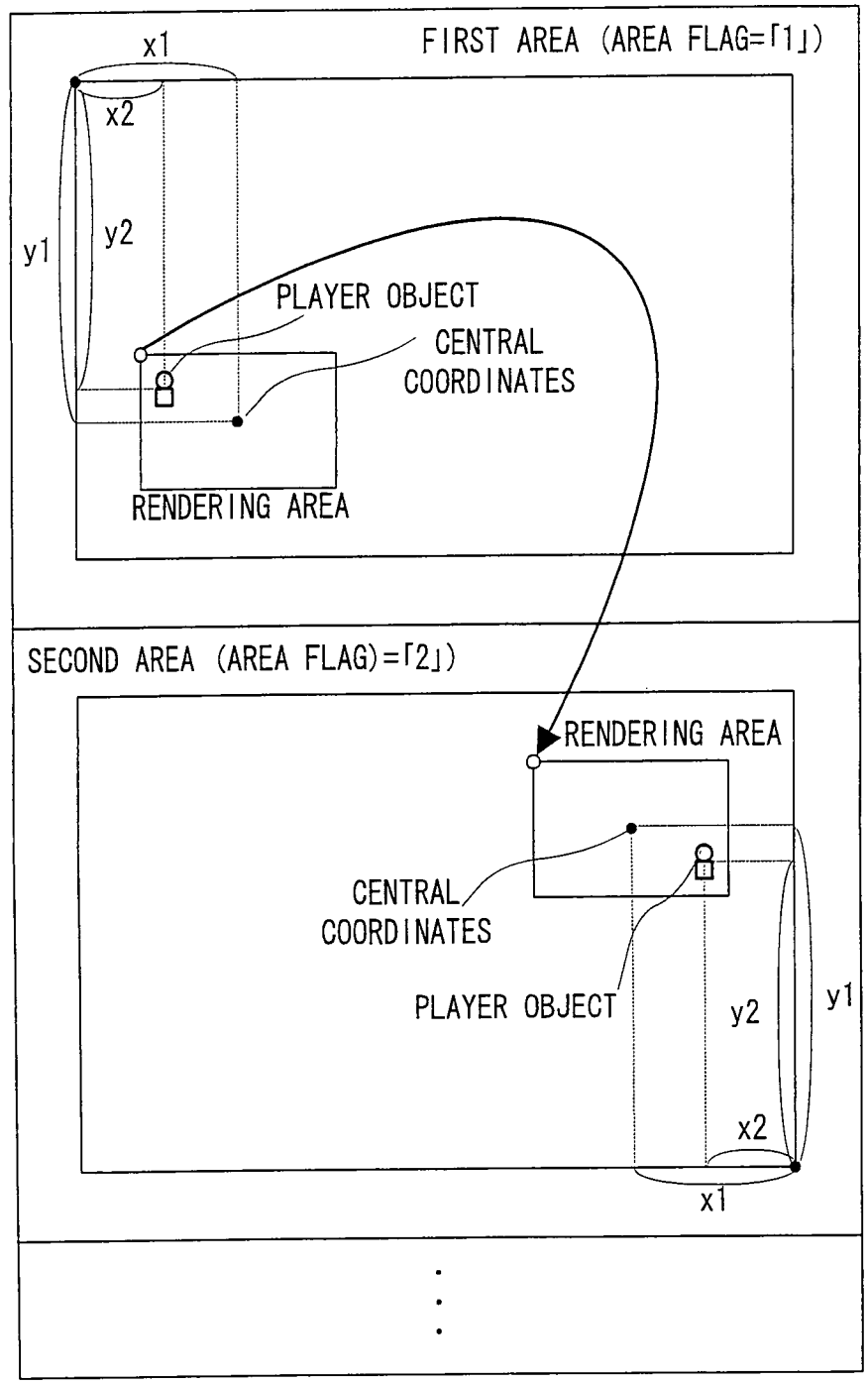
FIG. 18 is an illustrative view showing one example of rotation calculation shown in FIG. 16.

If "YES" in the step S51, the CPU core 34 obtains central coordinates in a field corresponding to the area flag (pre-rotation field) in a next step S53. FIG. 18 illustrates one example of field rotation in which the first area data constitutes a pre-rotation field (first field) and the second area data a post-rotation field (second field). In the example of FIG. 18, the origin point of absolute coordinates are provided at the upper left corner of the map, and coordinate values of x1, y1 are set as central coordinates of the first field, with respect to the origin point. Accordingly, in the step S53, the central coordinates x1, y1 are obtained.

In a succeeding step S55, the CPU core 34 obtains the coordinate values (central coordinates) of the player object in the first field in the absolute coordinates. The position (central coordinates) of the player object in the first field where the area flag is set to "1" in FIG. 8 is indicated by the values of coordinates x2, y2 with respect to the origin point. In the step S55, data on values of the central coordinates of the player object is obtained, for example. The value data of the central coordinates can be easily obtained from bitmap data.

After that, in a step S57, the first field is rendered with a rotation through a designated degree of angle (e.g. an angle of rotation designated by frame) around the central coordinates of the drawing area, by means of a separately provided hardware calculation circuit (e.g. DSP), not by means of the CPU core 34. In a step S59, the player object is displayed with no rotation, in the position at the angle designated in the step S57. If the display orientation of the player object is rotated, the rotated player object could be also rendered in the hardware calculation circuit with a decrease in the load on the CPU core 34. However, if the changed orientation of the player object is returned to the original one immediately after the end of the rotation process, an unnatural feeling will be produced in the display of the player object. This is why this rendering process is carried out in such a manner as described above.

When receiving a calculation end signal from the calculation circuit, the CPU core 34 determines as "YES" in a next step S63. The calculation circuit repeats the rotation process until a degree of angle corresponding to the second field (post-rotation field) has been reached, by repeatedly executing the steps S57 to S59 so that the CPU core 34 detects the end of the rotation.

In the example of FIG. 18, the central coordinates in the first and second game fields corresponding to each other between before and after the rotation are previously defined in the field memory area 76 (FIG. 3), and offset values from the central coordinates in the game field to the coordinates at the upper left corner in the game field is fixedly set.

In addition, by using the offset values from the central coordinates in the game field to the player character, it is possible to perform a rotation process only on the player character without changing the display coordinates in the game field.

There are other methods of rotation calculation, which include the one using the central coordinates and the absolute coordinates of the rendering area as shown in FIG. 18, the one using the central coordinates and the offset values from the origin point in the rendering area, and the one by which the coordinates (rotation central coordinates) of the player object is held in the absolute coordinates and the offset value therefrom is used, and so on. No more description will be given as to these methods.

If "YES" in the step S63 of FIG. 16, the CPU core 34 executes a map switch process in a next step S65. The map switch process is for switching map data, i.e., area data in preparation for a hit determination in the post-rotation field after the end of the rotation calculation in the steps S57 to S59.

Figure 17:
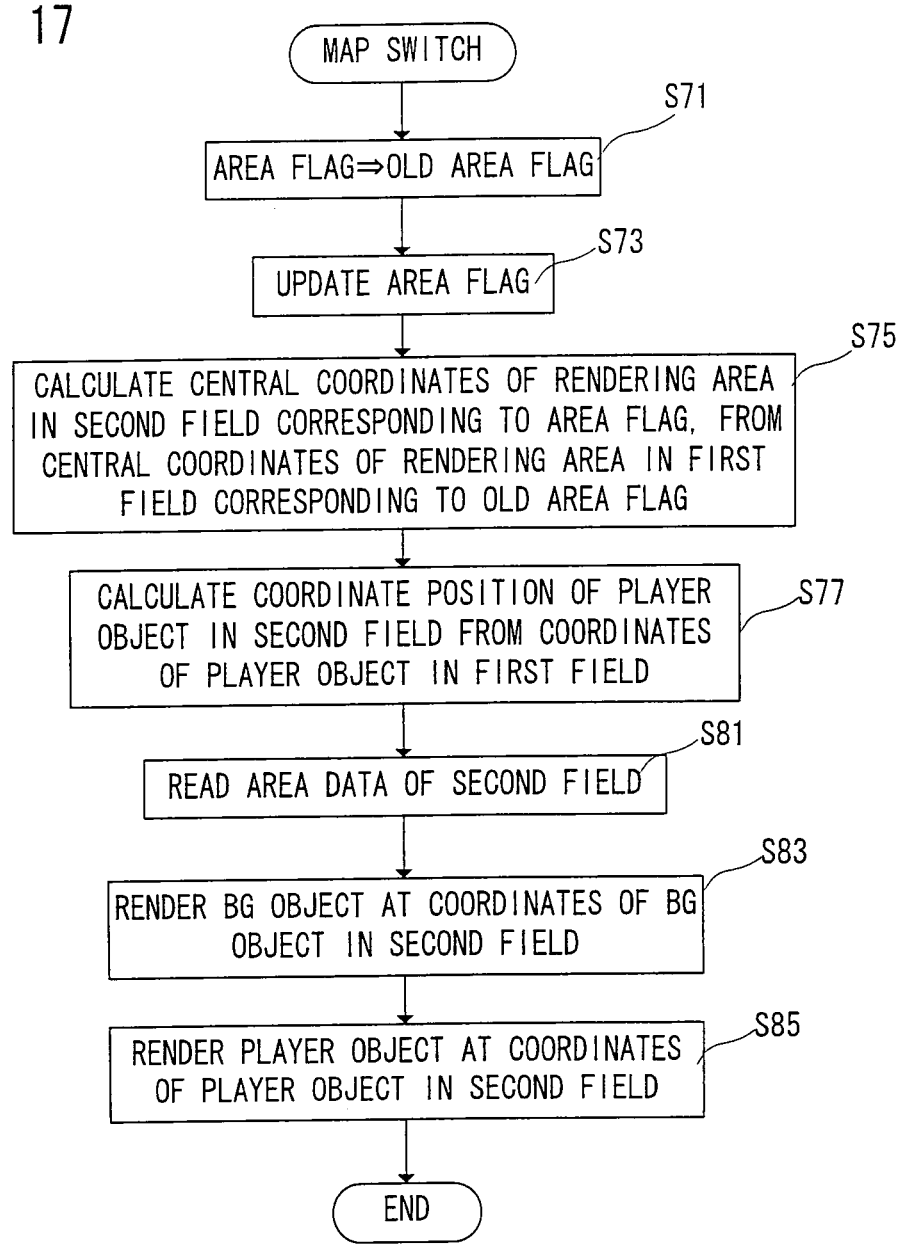
FIG. 17 is a flowchart showing the details of a map switch process shown in FIG. 16.

Referring to FIG. 17, in a first step S71, the CPU core 34 saves the area flag (area number) at that time as old area flag, and then carries out an area flag update by setting a new area number (post-rotation area number) to the area flag 80 of FIG. 3 (step S73).

After that, in a step S75, the CPU core 34 determines by calculation according to an equation 1 the central coordinates of a rendering area of the field corresponding to the current area flag (second field (post-rotation field)), from the central coordinates of the rendering area of the field corresponding to the old area flag (first field (pre-rotation field), as shown in FIG. 18.

$$\text{Central coordinate in second field} = x\_max - x1, y\_max - y1 \quad [\text{equation 1}]$$

where x_max represents maximum value of X coordinate in the map data, and y_max represents the maximum value of Y coordinate in the map data.

Then, in a succeeding step S77, the CPU core 34 calculates the coordinate position of the player object in the second field, from the coordinates of the player object in the first field, according to an equation 2.

$$\text{Central coordinate of player object} = x\_max - x2, y\_max - y2 \quad [\text{equation 2}]$$

where x_max represents maximum value of X coordinate in the map data, and y_max depicts the maximum value of Y coordinate in the map data.

Such a coordinate position refers to the central coordinates, and may be either absolute coordinates as shown in FIG. 18 or other relative coordinates.

Then, in a succeeding step S81, the CPU core 34 reads the second area data AD2 for the post-rotation second field as shown in FIG. 8 described above, into the field memory area 76 shown in FIG. 3. Now the map switch is completed, and thereafter the second area data is used for display of the post-rotation game field, i.e., the second field. More specifically, the CPU core 34 instructs the GPU 44 in steps S83 and S85 to render a BG object according to the second area data and render the player object in the coordinate position detected in the step S77.

As long as the game is played in the post-rotation game field, the game field is thereafter rendered by the second area data (step S11), and also the hit determination (step S7) and the scroll process (step S9) are carried out according to the second area data. That is, once the game field is rotated, the game processing is executed with a switch from the pre-rotation first area data to the post-rotation second area data.

The above exemplary embodiments are configured in such a manner that the first field is rotated clockwise through 180 degrees and turned into the second field. However, the angle of rotation or the degree and direction of rotation can be decided as appropriate. For example, the first field may be turned into the second field by rotating it clockwise or counterclockwise through 90 degrees.

Although certain exemplary embodiments have been described and illustrated in detail, it is clearly understood that the same is by way of illustration and example only and is not to be taken by way of limitation, the spirit and scope of these certain exemplary embodiments being limited only by the terms of the appended claims.

What is claimed is:

1. A non-transitory computer readable storage medium storing a game program executed by a computer of a game apparatus that displays on a display device a state of rotation of a field in which a player character capable of being operated by a player is placed, said game program allowing said computer to execute:

placing said player character within a first field formed by a plurality of objects and displaying on said display device a state of the first field containing at least the player character;

rotating said first field through a predetermined degree of angle, wherein the predetermined degree of angle is 90 degrees, 180 degrees or 270 degrees, when a predetermined requirement is satisfied and displaying a state of the rotation on said display device;

re-placing the player character placed in said first field, in a second field previously formed by a plurality of objects so as to be displayed in a manner identical to the first field rotated through said predetermined degree of angle when the rotation process of said first field has completed and of displaying on said display device a state of the second field containing at least the player character;

a first contact determination of whether an object in the first field and said player character have made contact when said first field is displayed, and a second contact determination of whether an object in the second field and said player character have made contact when said second field is displayed.

2. A non-transitory computer readable storage medium according to claim 1, wherein said objects forming the first field and said objects forming the second field are provided with a definition of a process to be performed when making contact with said player character, and said computer further performs a contact process based on the definition previously provided to an object when contact between said player character and said object is determined in said first contact determination and said second contact determination.

3. A non-transitory computer readable storage medium according to claim 1, wherein said first contact determination and said second contact determination include a contact direction calculation for calculating in which direction said player character made contact with an object, from a state of contact between said player character and said object.

4. A non-transitory computer readable storage medium according to claim 3, wherein said object is previously provided with a definition of a process to be performed when making contact with said player character, with respect to each of the contact directions, and said game program allows said computer to perform a contact process based on the definition with respect to the determined contact direction previously provided to said object, when contact between said player character and said object is determined in said first contact determination and said second contact determination.

5. A non-transitory computer readable storage medium according to claim 1, wherein said predetermined requirement is that said player character moves to a predetermined position in said first field.

6. A non-transitory computer readable storage medium according to claim 1, wherein said predetermined requirement is that said player character makes contact with a predetermined object in said first field.

7. A non-transitory computer readable storage medium according to claim 1, wherein said predetermined requirement is that a predetermined period of time passes after said display device displays a state of said first field.

8. A non-transitory computer readable storage medium according to claim 1, wherein said player character is rotated as with an object in which the player character makes contact.

9. A non-transitory computer readable storage medium according to claim 1, wherein said player character is not changed in display direction and is rotated as with an object in which the player character makes contact.

10. A non-transitory computer readable storage medium according to claim 1, wherein said player character is not rotated as with an object in which said player character makes contact.

11. A storage medium according to claim 1, wherein images of said player character before and after rotation are prepared in advance, the image before rotation is displayed in said first field and the image after rotation is displayed in said second field.

12. A game apparatus that displays on a display device a state of rotation of a field in which a player character capable of being operated by a player is placed, comprising:

a first display for placing said player character within a first field formed by a plurality of objects and displaying on said display device a state of the first field containing at least the player character;

a rotation display processor for rotating said first field through a predetermined degree of angle, wherein the predetermined degree of angle is 90 degrees, 180 degrees or 270 degrees, when a predetermined requirement is satisfied and displaying a state of the rotation on said display device; and a second display for re-placing the player character placed in said first field, in a second field previously formed by a plurality of objects so as to be displayed in a manner identical to the first field rotated through said predetermined degree of angle when the rotation process of said first field has completed by said rotation display processor and for displaying on said display device a state of the second field containing at least the player character a first contact determiner for determining whether an object in the first field and said player character have made contact when said first field is displayed, and a second contact determiner for determining whether an object in the second field and said player character have made contact when said second field is displayed.

13. A game apparatus according to claim 12, wherein said plurality of objects are provided with a definition of a process to be performed when making contact with said player character, further comprising:

a first contact processor for performing a contact process based on the definition previously provided to an object when contact between said player character and said object is determined by said first contact determiner and said second contact determiner.

14. A game apparatus according to claim 12, said first contact determiner and said second contact determiner include a contact direction calculator for calculating in which direction said player character made contact with an object, from a state of contact between said player character and said object.

15. A game apparatus according to claim 14, wherein said object is previously provided with a definition of a process to be performed when making contact with said player character, with respect to each of the contact directions, further comprising:

a second contact processor for performing a contact process based on the definition with respect to the contact direction calculated in said contact direction calculator previously provided to said object, when contact between said player character and said object is determined by said first contact determiner and said second contact determiner.

* * * * *